(12) United States Patent
Frohnhaus et al.

(10) Patent No.: US 6,264,274 B1
(45) Date of Patent: Jul. 24, 2001

(54) FRAME FOR A SEAT CARRIER OF A VEHICLE SEAT WITH A LEFT AND A RIGHT FRONT SWIVELLING SUPPORT

(76) Inventors: Ernst-Reiner Frohnhaus, Nettelbeckstrasse 4, D-42653 Solingen (DE); Burckhard Becker, Obenkatternberg 25, D-42655 Solingen (DE); Wilfried Beneker, Dierath 1, D-42799 Leichlingen (DE)

( * ) Notice: Subject to any disclaimer, the term of this patent is extended or adjusted under 35 U.S.C. 154(b) by 0 days.

(21) Appl. No.: 09/372,695

(22) Filed: Aug. 11, 1999

(30) Foreign Application Priority Data

Aug. 12, 1998 (DE) ............................ 298 14 223 U

(51) Int. Cl.⁷ ............................................ B60N 2/00
(52) U.S. Cl. ............................. 297/313; 297/327
(58) Field of Search ................... 297/452.18, 344.1, 297/313, 316, 327, 337

(56) References Cited

U.S. PATENT DOCUMENTS

| | | |
|---|---|---|
| 5,199,679 * | 4/1993 | Nakamura et al. . |
| 5,284,381 * | 2/1994 | Aoki et al. . |
| 5,310,154 * | 5/1994 | Ueda et al. . |
| 5,626,395 * | 5/1997 | Aufrere . |

* cited by examiner

Primary Examiner—Milton Nelson, Jr.
(74) Attorney, Agent, or Firm—K. S. Cornaby

(57) ABSTRACT

This frame for a seat carrier of a vehicle seat is provided with a left and a right side part (20, 22) and with a left and a right front swiveling prop (52, 54). The swiveling prop (52) is hinged in the front area of the left side part (20) and the right swiveling prop (54) in the front area of the right side part (22) and an adjusting device is provided by means of which the incline of the two swiveling props (52, 54) may be adjusted. One swiveling prop (52) a) is arranged on the outer side of the side part (20) to which it belongs, b) is hooked out downwards starting from the hinge joint connecting it to this side part (20), c) has a stiffening (64) across its plane of motion and d) is rigidly connected with the other swivelling prop (54) via a cross tube (50).

Figure 1:
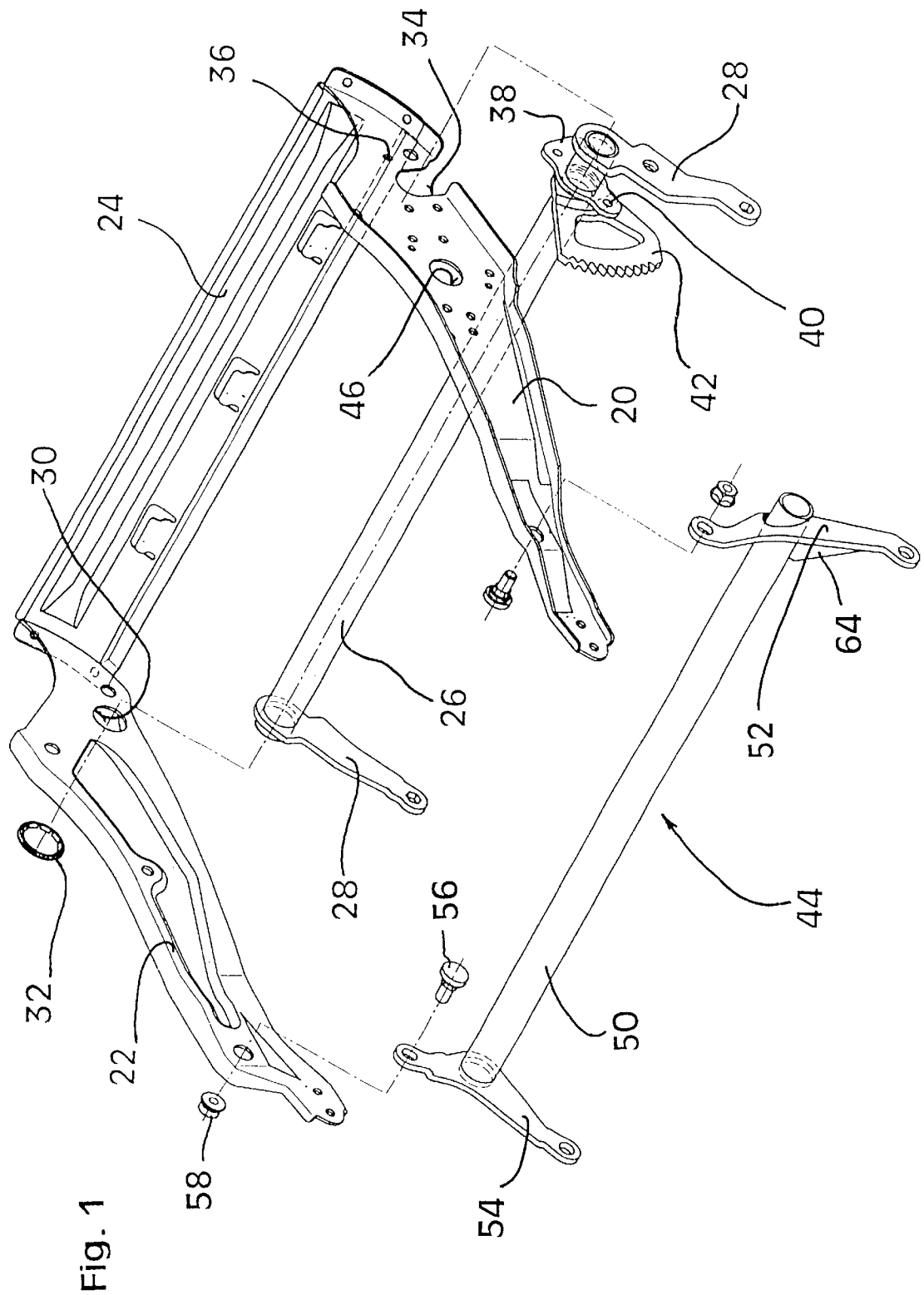

12 Claims, 2 Drawing Sheets ically into the interior of the vehicle. This is the direction against which the seat shifts due to the obliquely outward hooking of the right swivelling prop 42.

FRAME FOR A SEAT CARRIER OF A VEHICLE SEAT WITH A LEFT AND A RIGHT FRONT SWIVELLING SUPPORT

The invention relates to a frame for a seat carrier of a vehicle seat with a left and a right side part and with a left and a right front swivelling prop arm, whereas the left swivelling prop is hinged in the front area of the left side part and the right swivelling prop in the front area of the right side part and whereas an adjusting device is provided by means of which the incline of the two swivelling props may be adjusted.

The allocation in vehicle seats often is that the left couple of rails longitudinally guiding the vehicle seat is located essentially perpendicularly underneath the left side part of the seat carrier, that in the same way, the right couple of rails longitudinally guiding the vehicle seat is located essentially perpendicularly underneath the right side part of the frame for a seat carrier. The arrangement is at least often symmetrical, so that, if there is displacement, it is mirror-inverted on the other side of the seat.

One tries one's best to arrange the couples of rails near the lateral, stiffened areas of the underbody, that means to fasten the couple of rails located outside the vehicle near the swell there or directly on the swell and the couple of rails located inside the vehicle near the tunnel there or directly on the tunnel. This entails that the usual, symmetrical arrangement between the longitudinal guiding and the frame for the seat carrier cannot always be upheld and more particularly that unilateral displacement to the side takes place. The invention is dealing with a seat frame for this instance.

The object of the present invention is to show a seat frame that is suitable for a seat carrier arranged in strong lateral displacement relative to a longitudinal guiding and that foils the mechanical loads occurring due to the unilateral displacement in the easiest possible way.

On the basis of the frame for the seat carrier mentioned above, the solution of the invention is to have one swivelling prop a) arranged on the outer side of the side part to which it belongs, b) hooked out downwards starting from the hinge joint connecting it to this side part, c) stiffened across its plane of motion and d) rigidly connected with the other swivelling prop via a cross tube.

According to the invention the one front swivelling prop is strongly hooked out whereas the other swivelling prop (of the other side of the seat) is not. The strongly hooked out swivelling prop, which is running slantways down and outwards, is stiffened and is arranged on the outer side of the side part to which it belongs. This swivelling prop is essentially taking up the big displacement provided on the corresponding side of the seat relative to the corresponding couple of rails. On the other side of the seat, the displacement is much smaller, for example three to five times as small.

The stiffening confers enough stability on the corresponding front swivelling prop even across its plane of motion. Accordingly, the stiffening is running across its plane of motion. The plane of motion of the swivelling prop is the plane in which it is moving when swivelled around its hinge point on the corresponding swivelling prop.

A certain portion of displacement is already realized by the arrangement of the hooked out swivelling prop on the outer side of the corresponding side part. Since the other side of the seat should have much smaller displacement or no displacement at all, its swivelling prop is preferably hinged on the interior surface of the corresponding side part.

Thanks to the cross tube, the two swivelling props are rigidly connected so as to form a H-shaped unit. Thus, the adjusting forces are simultaneously led on both swivelling props. The cross tube has an additional stiffening effect since lateral forces applying on the hooked out swivelling prop are also transmitted via the cross tube onto the other swivelling prop. Preferably, the cross tube is connected to the swivelling props in the area of the longitudinal centre of the swivelling props.

It proved particularly preferable to have the front swivelling prop located on the outer side of the vehicle provided with the stiffening. The couple of rails on the outer side of the vehicle may thus be displaced quite far to the side and outwards, that means that big displacement may take place between a perpendicular line described by the corresponding swivelling prop and the couple of rails on the outer side of the vehicle.

The mechanical effect of the stiffening is increased by the fact that the stiffening is connected to the cross tube. The cross tube is thus also contributing to increase the lateral stiffness of the stronger hooked out swivelling prop.

The swivelling prop provided with the stiffening and located at the outer side of the vehicle is preferably hooked out at least three times, particularly five times more than the other swivelling prop on the inner or on the outer side of the vehicle. The seat is thus arranged unsymmetrically to the longitudinal guiding. The other swivelling prop is preferably an essentially even part.

It proved preferable to have the cross tube running at an angle of 10 to 30 degrees to the main direction of the stronger hooked out swivelling prop, that means preferably of the swivelling prop located on the outer side of the swivelling prop.

Figure 2:
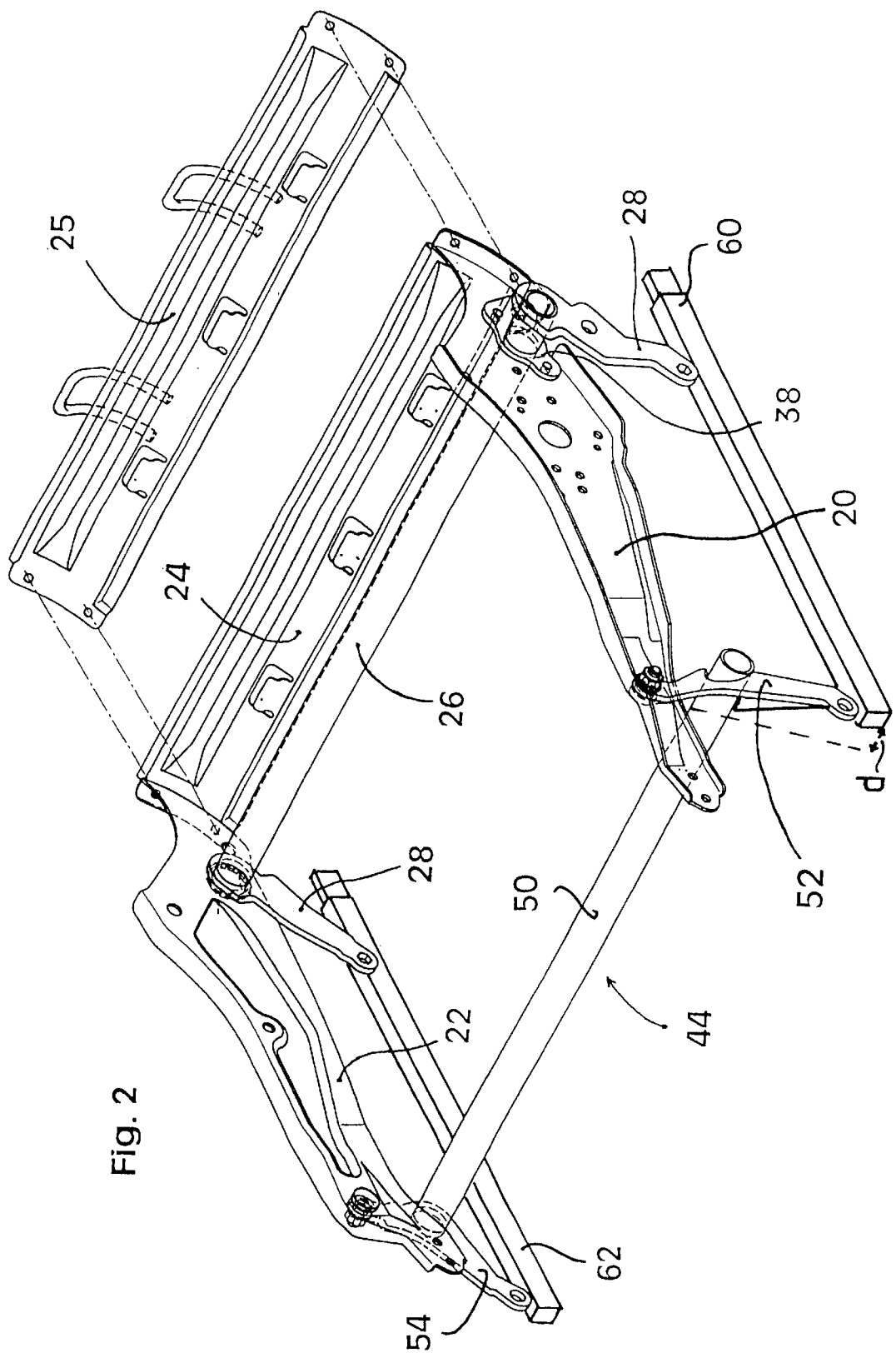

Further advantages and characteristics of the invention will become clear in the other claims and in the description of the embodiment of the invention. The embodiment mentioned is an example and is not limiting the scope of the invention. Said embodiment is shown in the drawing with the aid of which it will be explained in more details. The drawing shows in:

FIG. 1: an exploded view of an assembly drawing of a seat carrier for a seat frame and FIG. 2: a representation of the seat carrier similar to FIG. 1, but this time not in an assembly drawing but already assembled and with corresponding couples of rails of a longitudinal guiding.

As may be seen in FIGS. 1 and 2, the seat carrier has a left side part 20, a right side part 22 and a rear tie-bar 24. The denominations left and right as well as front and rear are always understood from the point of view of a passenger seated on the seat carrier.

The seat carrier also has a rear transverse shaft 26 on which a left and a right adjusting arm 28 are fastened, for example by welding. As may be seen in FIG. 1, the transverse shaft 26 is freely projecting beyond the right adjusting arm 28, so that this free end may be inserted in a bore for the bearing 30 of the right side part 22. The fixation occurs by means of the figured safety ring 32.

The left side part 20 has a location recess 34 that is open in its lower part. To the right and left of the location recess 34, holes are provided that are called first fastening means 36. A bearing part 38 is encompassing the transverse shaft 26, said bearing part bearing the transverse shaft 26 on one hand whereas on the other it constitutes second fastening means 40 also designed as holes. The bearing part 38 is bridging the location recess 34 and constitutes, after its fixation on the corresponding left side part 20, the actually missing bore for the bearing for the left area of the transverse shaft 26. In the embodiment shown, the bearing part 38 is located after mounting on the inner side of the left side part 20, that is to say between the two side parts 20, 22. By comparison, the left adjusting arm 28 is located on the outer side of the left side part 20.

Further inwards, on the transverse shaft 26, that is to say facing the right side part 22 from the bearing part 38, a driving part 42 is connected with the transverse shaft 26. In fact it is provided with a toothed quadrant.

The description explained that the transverse shaft 26, together with its two adjusting arms 28, the bearing part 38 and the driving part 42, may be completely prefabricated as a modular unit. This unit may later on, as shown in FIG. 1 by the dot-dash upper mounting line, be inserted into the prefabricated unit constituted by the two side parts 20, 22 and the rear tie-bar 24.

As figures one and two are showing, the rear tie-bar 24 is connected to the two side parts 20, 22 by four connection points. These connection points are removable. They may be screw connections for example. They may also be removably rivetted. The bearing part 38 may also be connected to the border area of the location recess 34 by means of the fastening means 36, 40 by welding, rivetting, screwing or the like.

As may be seen in FIG. 2, two different tie-bars 24, 25 may be used. The tie-bar 24 shown mounted is a normal tie-bar. It has, according to a known procedure, holding devices for receiving the seat springs extending forward. They are not shown here. By releasing the four connection points designed accordingly, the tie-bar 24 may be replaced by a tie-bar 25 provided with bows for an Isofix-fastening. This is represented by the four parallel dash-dot mounting lines. Except the two Isofix-bows, the tie-bar 25 does not differ from the tie-bar 24.

The FIGS. 1 and 2 also show a front swivelling bridge 44. It consists of a cross tube 50 and of two swivelling props 52, 54 that have each at their upper and at their lower end a bore for a bearing and that are tightly connected to each other in their centre by the cross tube 50. This unit too may be preassembled and integrated subsequently into the described arrangement as it is also shown by the two lower dash-dot mounting lines. Fastening means are provided on either end of the two mounting lines, said fastening means being here designed as screws 56 and nuts 58.

The figures are showing that the right swivelling prop 54 is an essentially even sheet metal stamping. It is arranged on the outer side of the right side part 22, as may be seen in FIG. 2. Below said swivelling prop and essentially perpendicular to it, a right-side couple of rails 60 of a longitudinal guiding is located. As opposed to it, the left swivelling prop 52 is strongly hooked out in an out and downward direction and is thus running diagonally. This entails that a corresponding left couple of rails 62 is located at a distance d from a perpendicular through the connecting area between the left swivelling prop 42 and the left side part 20 that is also called displacement. This displacement d is at least three times, preferably five times as big as on the right side as a comparison with said right side is showing.

In its connecting area, the left swivelling prop 52 is running slantways with the cross tube 50. This may be told by the elliptical connecting line. The cross tube 50 is running almost perpendicular to the right swivelling prop 54 as may be seen from the circular connecting line.

The left swivelling prop 52 has a stiffening 64 having essentially the shape of a triangular piece of sheet metal. This triangular piece of sheet metal is preferably integrated into the swivelling prop 52 itself so as to make one single piece and is bent out of its plane so as to stand across the plane of motion in which the left swivelling prop 52 is swivelling around its hinge point on the left side part. The stiffening 64 is tapered downwards. On its top, along one of the sides of the triangle, it is connected to the cross tube 50. It is also possible to insert a corresponding stiffening above the cross tube although this possibility is not illustrated here.

Each front end of the two side parts 20, 22 is provided with two holes. A front tie-bar (not shown) may be arranged here.

As may be seen in FIGS. 1 and 2, the two side parts 20, 22 are mirror-inverted, but essentially similar in construction with the exception of the area of the bore for the bearing 30 or the location recess 34. Near the location recess 34 a hole is provided in the side part 20, said hole being designed here as a bearing 46. Several fastening holes are provided around this bearing 46. An electromotor may be flange-mounted around the bearing 46. It has the following peculiarity: its gearbox case is open in the area facing the side part 20, that is the gearbox case has no wall there. The side part 20 takes over the part of the lacking wall of the gearbox case in the area around the bearing 46. Thus weight is saved, the output shaft of the electromotor 48 is borne with precision in side part 20 and the association with the driving part 42 is satisfactory.

It is also possible to insert directly into the left side part 20 an accordingly enlarged bearing part 38 instead of a bearing, said bearing part taking at the same time charge of the bearing of the output shaft of the electromotor and of the closing of the gearbox case.

What is claimed is:

1. Frame for a scat carrier of a vehicle seat of a vehicle, said frame comprises i) a left side part, ii) a right side part, iii) a left swivelling prop, and iv) a right swivelling prop, said left swivelling prop being hinged in a front area of said left side part and said right swivelling prop being hinged in a front area of said right side part, said frame further comprises an adjusting device by means of which an incline of said left swivelling prop and said right swivelling prop may be adjusted relative to said left side part and said right side part, one of said left swivelling prop and said right swivelling prop a) being arranged on an outer side of the side part to which a said one of said left swivelling prop and said right swiveiling prop is hinged, said outer side facing away from the other side part, b) being hooked out downwards starting from a hinge joint in which said one of said left swivelling prop and said right swivelling prop is hinged to said front area and c) having a stiffening extending at least partially in a direction parallel to an axis of said hinge joint, said right swivelling prop and said left swivelling prop being rigidly interconnected by a cross tube, said cross tube running parallel to said axis of said hinge joint.

2. Frame for a seat carrier according to claim 1, wherein said stiffening is situated on a side of said frame adapted to face a door of said vehicle.

3. Frame for a seat carrier according to claim 1, wherein said left swivelling prop has a lower end and is provided at said lower end with a location recess for bearing said left swivelling prop in a seat rail of a longitudinal guide and said right swivelling prop has a lower end and is provided at said lower end with a location recess for bearing said right swivelling prop in a seat rail of a longitudinal guide.

4. Frame for a scat carrier according to claim 1, wherein said stiffening is arranged in an area where said cross tube is connected to the swivelling prop exhibiting said stiffening.

5. Frame for a seat carrier according to claim 1, wherein said stiffening is essentially of a triangular shape.

6. Frame for a seat carrier according to claim 1, wherein said left side part and said right side part are rigidly interconnected.

7. Frame for a seat carrier according to claim 1, wherein the swivelling prop provided with said stiffening is crossing said cross tube at an angle of between 10 and 30 degrees.

8. Frame for a seat carrier according to claim 1, wherein the swivelling prop provided with said stiffening is hooked out at least at three different locations.

9. Frame for a seat carrier according to claim 1, wherein the other swivelling prop not provided with said stiffening is arranged on an inner side of the side part to which it is hinged, said inner side facing the side part provided with said stiffening.

10. Frame for a seat carrier according to claim 1, wherein said left side part and said right side part are interconnected.

11. Frame for a seat carrier according to claim 1, wherein the other swivelling prop a) does not exhibit a stiffening and b) is far less hooked out than the swivelling prop provided with said stiffening.

12. Frame for a seat carrier according to claim 11, wherein the other swivelling prop not provided with said stiffening is essentially flat.

* * * * *